F. B. CARLISLE.
TIRE CASING AND PROCESS OF MAKING SAME.
APPLICATION FILED JULY 27, 1915.
1,294,330.
Patented Feb. 11, 1919.
2 SHEETS—SHEET 1.
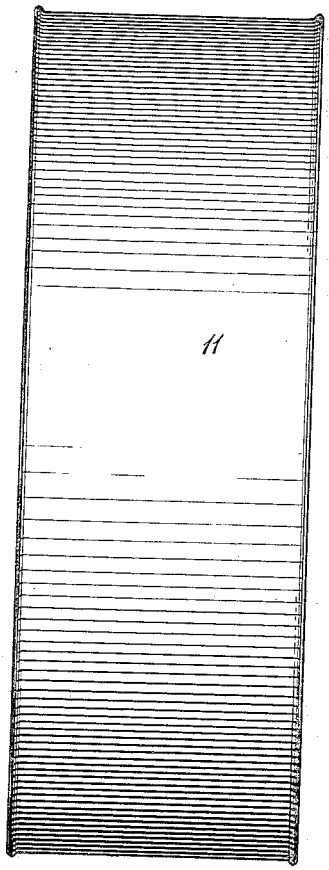
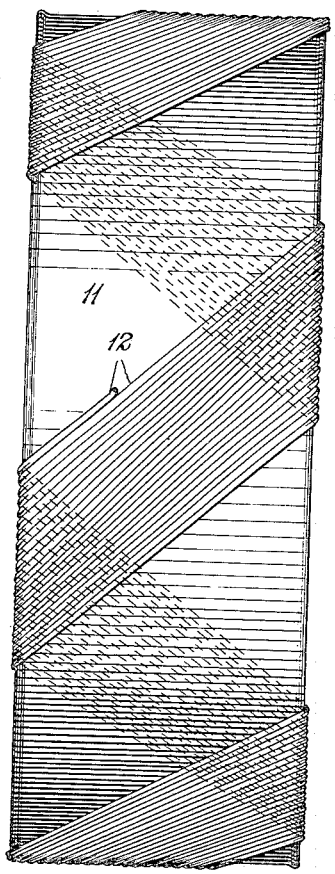
WITNESSES
INVENTOR
Fred B. Carlisle
BY
ATTORNEYS F. B. CARLISLE.
TIRE CASING AND PROCESS OF MAKING SAME.
APPLICATION FILED JULY 27, 1915.
1,294,330.
Patented Feb. 11, 1919.
2 SHEETS—SHEET 2.
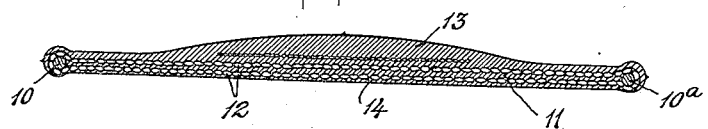
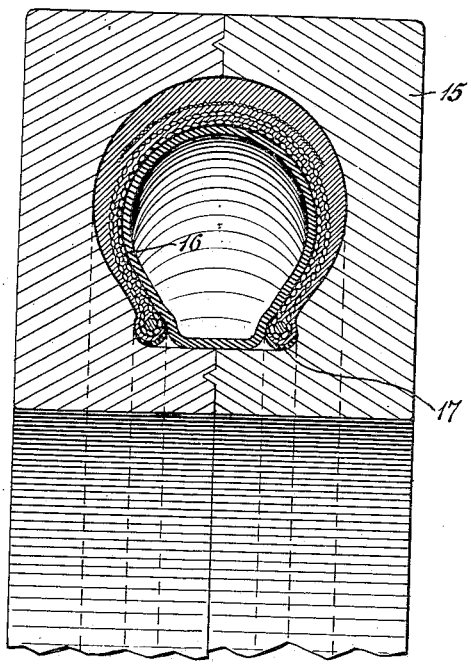
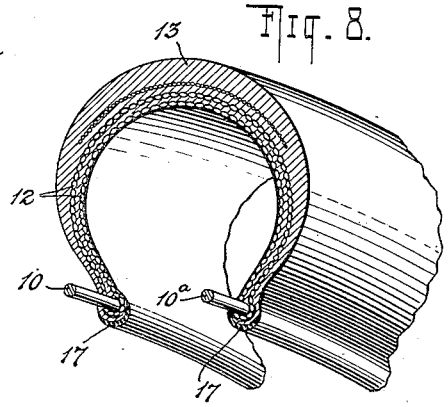
WITNESSES
INVENTOR
Fred B. Carlisle
BY
Briesen Knauth
ATTORNEYS

UNITED STATES PATENT OFFICE.

FRED B. CARLISLE, OF PROVIDENCE, RHODE ISLAND, ASSIGNOR TO JOSEPH M. GILBERT, OF NEW YORK, N. Y.

TIRE-CASING AND PROCESS OF MAKING SAME.

1,294,330.  Specification of Letters Patent.  Patented Feb. 11, 1919.

Application filed July 27, 1915. Serial No. 42,125.

*To all whom it may concern:*

Be it known that I, FRED B. CARLISLE, a citizen of the United States, and a temporary resident of Providence, county of Providence, and State of Rhode Island, have invented certain new and useful Improvements in Tire-Casings and Processes of Making Same, of which the following is a specification.

My invention relates to processes for making pneumatic tires and more particularly to processes for making tire casings whereby the inner tube of the type of tires known as "double tube tires" are inclosed. My invention has for its object to provide a process in which the use of the customary core on which such casings are usually built up is entirely avoided and whereby a tire casing of maximum efficiency is produced in a simple manner. My improvement will be fully described hereinafter and the features of novelty will be pointed out in the appended claims. It is of special value for cord tires and will be described in connection with such tires.

In the accompanying drawings which by way of example show various steps of my improved process and the product resulting therefrom, Figures 1 and 2 are elevations of the structure during initial stages of the process; Figs. 3 and 4 are somewhat exaggerated diagrammatic cross-sectional views thereof; Fig. 5 is a sectional view of the breaker strip or tread; Fig. 6 is a sectional view of the products after the breaker strip or tread has been attached; Fig. 7 is a cross-section of a vulcanizing mold with the case therein and Fig. 8 is a detail perspective section of the finished product.

In carrying out my improved process two annular members or rings 10 and 10ª, such as are ordinarily employed in tire construction, are set up in axial alinement and parallel with each other and at a predetermined distance apart, any suitable means being used for maintaining said rings in the desired position and relation to each other. The predetermined distance between the rings is manifestly, as shown in the drawings (compare for example Figs. 3, 4, or 6 with Fig. 8), approximately that corresponding to the inner transverse periphery of the tire. The said rings 10 and 10ª are then connected by means of a thin sheet 11 of unvulcanized and sticky or tacky rubber, which extends between and completely around said rings in a circumferential direction for instance as shown in Fig. 4 of the drawings. The sticky or tacky property of the rubber sheet 11 may be utilized for securing the opposite edges thereof to the rings 10 and 10ª or any suitable means may be used for this purpose. I next take a cord 12 preferably rubberized or otherwise treated to give it the characteristic of stickiness and secure one end thereof to ring 10 and then pass it over or across the outer surface of the rubber sheet 11 to the other ring 10ª preferably at an acute angle shown in the drawing, for illustrative purposes as approximately 45°. It is obvious that the sticky cords when passed over the surface of the sticky rubber sheet 11 will adhere thereto and that in case of non-adherence of any particular cord such adherence will take place as soon as the rubber and the cords come in contact. In this respect Fig. 4 exaggerates the distance between the rubber sheet 11 and the cords 12 although it is apparent even with respect to that figure that any handling of the structure will bring about surface contact between the periphery of the cord and the surface of the rubber and thus cause tangential, adhering contact between the two. This cord is then passed around the outside of the ring 10ª and around the same and over or across the inner surface of the sheet 11, back toward the ring 10, this inner winding passing forward from the bend around the ring 10ª also at an acute angle. The cord 12 is then again passed around the ring 10 and over the outer surface of the sheet 11 back toward the ring 10ª again at an angle. This back and forth, over and under winding of the cord 12 about the rings 10 and 10ª and over or across the opposite surfaces of the sheet 11 is continued until a complete circuit of the structure has been made. The winding of the cord 12 is then further continued in the same way to form an additional winding lying closely along side of the first so as to be in effect contiguous thereto, which winding operation is carried on until a complete inner and outer sheet of closely adjacent contiguous cords 12 has been formed about the rings 10 and 10ᵃ and across or over the opposite faces of the sheet 11 as shown in Fig. 1. These cords are manifestly, except for surface contact therewith, separate from the sheet of rubber 11; they are not embedded in the rubber sheet and consequently when the crude carcass assumes the tubular shape, are capable of relative movement with reference to the surface of the sheet of rubber 11.

When the operations thus described have been carried out, the crude carcass foundation is complete and ready to receive the tread stock. This may be applied in the usual manner upon the surface of the foundation after the same is first shaped up to the general tubular form, or the tread may be applied in the following special manner. As a separate step the breaker strip or tread portion 13 consisting for instance of a combination of fabric and uncured rubber is first prepared in a flat and uncured condition as shown in Fig. 5 and is then applied to the outer surface of the outer cord layer of the crude carcass while still in the form of a cylinder and secured thereto under pressure as by passing between suitable pressure rollers or other means, it being understood that the opposite edges of said tread portion, at the finish of this step in the process, preferably extend about the rings 10 and 10ᵃ as shown in Fig. 6. Another sheet or layer of thin, preferably sticky or tacky rubber 14 is then applied to or over the inner surface of the inner cord layer as also shown in Fig. 6. As the next step in the process the rings 10 and 10ᵃ are pressed or forced toward each other to cause the combined rubber sheets 11, 14, cords 12 and tread portion 13 to bulge outwardly, the product in this condition being placed in the vulcanizing mold 15 as shown in Fig. 7. An air bag 16 placed within the case and with it, in the vulcanizing mold, may be inflated in any suitable manner to force outwardly that portion of the casing between the rings and to force the casing into firm contact with the molding surface of the mold and the parts of the case into close engagement with each other. If desired means other than an air bag may be utilized to properly distend or hold the case properly in the mold. After having been inflated or otherwise distended the case may be gone over and examined before being placed in the mold and if desired a cushion strip 17 may be placed on the bead of the case to straighten this portion. After the case is placed in the mold it is thoroughly vulcanized so that when removed from the mold it has the appearance illustrated in Fig. 8. During the vulcanization of the case the air within the same becomes heated and consequently expands thus increasing the internal pressure within said case, the result being that the individual elements of the structure are formed into a solid, homogenous mass and all wrinkles or other inequalities are completely removed from the inner surface thereof which in consequence is extremely smooth and even throughout its extent. The outer surface of the case is at the same time efficiently formed to correspond exactly to the molding surface of the mold and is entirely free from imperfections.

It will be seen from an inspection of Fig. 7 that the pressure supplied from the air bag is in the direction of driving the cord structure into the rubber of the tread stock as the same becomes softened in the vulcanizing mold. Inasmuch, however, as the two cord layers are separated by the rubber sheet 11, the pressure transmitted in the mold will begin with the inner cord layer pressing against the sheet 11 and through the sheet 11 against the outer cord layer. The presence of the rubber sheet 11, with the pressure of the inner cord layer behind it, prevents the tread stock from penetrating through to the inner cord layer or beyond the point where the tread stock and the sheet 11 come into contact. This obviously means that only the outer layer of cords can to any extent force their way into the tread stock and that the tread stock cannot enter as such between the adjacent cords beyond the median line between the two cord layers since that median line is occupied by the sheet 11. Inasmuch as the tread stock of tires is usually compounded to serve the special purposes of that part of the tire and is, consequently, different in constitution from a sheet of rubber such as is adapted for use in making the rubber sheet 11, this characteristic of the tire made according to my process, just described, can serve as a means of identifying a completely finished and vulcanized tire as having been made by my process.

It will be seen that my improved case is built up initially in substantially the form of a tubular cylinder and without the use of a core of any kind, this arrangement permitting the cords to be wound completely around, under and over the rings in one general direction and doing away with the necessity for alternate right and left hand windings. The use of hooks or other projections for the accommodation of the cords is also avoided, this absence of hooks or other injurious projections heretofore used, reducing the internal wear in the casing and preventing injury thereto due to the effects of said hooks or projections during use of the case. My improved process produces a case of much greater efficiency than heretofore and capable of being manufactured in a simple manner and of relatively light weight without affecting its wearing qualities. A case constructed according to my improved process is further capable of effectively withstanding the effects of high speed for a much greater period of time than heretofore and is adapted to be easily repaired. At the same time my improved process eliminates 33% or more of the present cost of labor in building the casing. Owing to the tacky condition of the rubber elements of my case and the impregnation of the cords with rubber cement the whole become closely united during vulcanization and are capable of withstanding severe strains without becoming separated. A maximum of traction and braking efficiency is also obtained with my improved case.

My improved process makes it possible to manufacture Dunlop or clencher tires with equal facility, the beads in the case of the latter type of tires being formed in the usual manner.

Various changes in the specific steps and forms shown and described may be made within the scope of the claims without departing from the spirit of my invention. Bands or strips may be used in place of the cords. The layer 11 which serves to vulcanize the cord layers together and acts as a cushion to prevent friction, while a valuable addition in the finished case is not to any substantial extent involved in the winding operation although even there it does, when used, assist the cord in retaining its proper position on the rings, especially where, as stated in the last paragraph of this specification, a series of parallel cords is used, in which case it is manifest that the rubber sheet and the cords may be applied to the rings simultaneously inasmuch as the parallel cords, when a sufficient quantity is used, may carry with themselves during their helical application to the rings, an adhering sheet of rubber so that when the helical winding is complete the crude carcass will consist, as already described, of a cylinder composed of two spaced rings, connected by sheeted rubber, the rings and rubber being completely enveloped by a series of contiguous parallel cords crossing each other at approximately right angles on opposite faces of the cylinder.

So far as the angle is concerned at which the cords are laid over the rings good results can be accomplished by using an angle somewhat more acute than 45° but any angle will accomplish the same result in so far as the winding of a continuous layer is concerned and I do not, therefore, limit myself to the use of any special angle.

The cord layers may be made of a single cord throughout although two or more of such continuous cords, located side by side will of course accomplish the same result. In practice the use of more than one cord is in some cases more convenient.

I claim:

1. In the process of making cases for pneumatic tires that improvement which consists in arranging two annular members in parallel and axial alinement spaced apart to a distance approximating the inner transverse periphery of the tire case, applying rubber in sheet form between said annular members while thus spaced apart and also a helical cord winding to completely envelop said annular members and to completely inclose the sheeted rubber, the cords being laid so as to be contiguous and, except for tangential adherence thereto, out of contact with said sheeted rubber, and forcing ouwardly the central circumferential portion of cord winding between said annular members.

2. That improvement in the process of making cases for pneumatic tires which consists in arranging two annular members in parallel and axial alinement spaced apart to a distance approximating the inner transverse periphery of the tire case, applying rubber in sheet form between said annular members while thus spaced apart and also a helical cord winding to completely envelop said annular members and to completely inclose the sheeted rubber, the cords being laid so as to be contiguous and, except for tangential adherence thereto, out of contact with said sheeted rubber, applying the tread stock to the outer surfaces of said cord winding, forcing outwardly the central circumferential portion of cord winding between said annular members and converting said casing into the finished product by vulcanization.

3. In the process of making cases for pneumatic tires that improvement which consists in arranging two annular members in parallel and axial alinement spaced apart to a distance approximating the inner transverse periphery of the tire case connecting said annular members by means of sheeted rubber to form a tubular cylindrical unit and completely enveloping said cylindrical unit by a series of contiguous parallel helically wound cords, said cords, except for tangential adherence thereto, being out of contact with said flexible material, then causing movement of said annular members toward each other and simultaneously causing the intermediate portions of said unit to bulge outwardly.

4. The process of making cases for pneumatic tires which consists in arranging two rings in parallel and spaced relation to each other in axial alinement, forming a substantially flat cord layer between said rings to connect the same together, combining a tread portion with said cord layer, forcing said rings toward each other to bulge said cord layer and tread portion outwardly and vulcanizing same in this condition to form the case.

5. The process of making cases for pneumatic tires which consists in arranging two rings in parallel and spaced relation to each other in axial alinement, passing a cord back and forth between said rings to form a substantially flat layer connecting said rings together, combining a tread portion with said layer, forcing said rings together to bulge said cord layer and tread portion outwardly and vulcanizing same in this condition to form the case.

6. The process of making cases for pneumatic tires which consists in arranging two rings in parallel and spaced relation to each other in axial alinement, passing a cord back and forth between said rings and around the same to form inner and outer substantially flat layers connecting said rings together, combining a tread portion with said outer layer, forcing said rings together to bulge said cord layers and tread portion outwardly and vulcanizing same in this condition to form the case.

7. The process of making cases for pneumatic tires which consists in arranging two rings in parallel and spaced relation to each other in axial alinement, connecting said rings by means of a thin sheet of flat, unvulcanized rubber, passing a cord back and forth around said rings and across the opposite faces of said sheet of rubber to form inner and outer substantially flat cord layers adjacent to the opposite faces of said sheet of rubber, combining a tread portion with said outer cord layer, forcing said rings toward each other to bulge said cord layers, sheet of rubber and tread portion outwardly, and vulcanizing the whole in this condition to form the case.

8. The process of making cases for pneumatic tires which consists in arranging two rings in parallel and spaced relation to each other in axial alinement, connecting said rings by means of a thin sheet of flat, unvulcanized rubber, passing a cord back and forth around said rings and across the opposite faces of said sheet of rubber to form inner and outer substantially flat cord layers adjacent to the opposite faces of said sheet of rubber, combining a tread portion with said outer cord layer, covering said inner cord layer with a thin sheet of flat, unvulcanized rubber, forcing said rings toward each other to bulge said cord layers, sheets of rubber and tread portion outwardly and vulcanizing the whole in this condition to form the case.

9. The process of making cases for pneumatic tires which consists in arranging two rings in parallel and spaced relation to each other in axial alinement, connecting said rings by means of a thin sheet of flat, unvulcanized rubber, passing a cord impregnated with rubber cement back and forth around said rings and across the opposite faces of said sheet of rubber at angles of approximately 45° to said rings to form inner and outer substantially flat cord layers adjacent to the opposite faces of said sheet of rubber, combining an unvulcanized rubber tread portion with said outer cord layer, covering said inner cord layer with a thin sheet of flat unvulcanized rubber, forcing said rings toward each other to bulge said cord layers, sheets of rubber and tread portion outwardly, forcing the whole in its outwardly bulged condition into contact with a molding surface and vulcanizing the same to form the case.

10. A foundation carcass for pneumatic tires comprising a pair of annular members in axial alinement spaced apart to a distance approximately equal to the inner transverse periphery of the tire casing to be produced, rubber in sheet form connecting said annular members, outer and inner cord layers consisting of a contiguous parallel cord extending continuously around said annular members and in a helical direction, thus enveloping said sheet of rubber, the cords, except for tangential adherence thereto, being out of contact with said sheeted rubber.

11. A foundation carcass for pneumatic tires comprising a pair of annular members in axial alinement spaced apart to a distance approximately equal to the inner transverse periphery of the tire casing to be produced, rubber in sheet form connecting said annular members, outer and inner cord layers consisting of a contiguous parallel cord extending continuously around said annular members and in a helical direction, thus enveloping said sheet of rubber, the cords, except for tangential adherence thereto, being out of contact with said sheeted rubber, and an inner sheet of rubber covering the inner cord layer.

12. A case for pneumatic tires consisting of a pair of annular members in axial alinement, rubber positioned while in sheet form connecting said annular members, said annular members and sheet rubber being enveloped by helically positioned continuous cords forming an inner and an outer cord layer, the two cords crossing each other at approximately right angles, the cords of each layer being out of parallelism with respect to each other to such an extent that if the annular members and the cords were drawn apart into cylindrical form true parallelism and contiguity of all the cords would be obtained, a tread carried by the outer layer of said cords, an inner sheet of rubber covering the inner cord layer, the entire casing being vulcanized together, each cord being thus completely surrounded with vulcanized rubber of which that portion between the crossing cords is constituted of the sheeted rubber first mentioned, by means of which the two cord layers are thus positively separated, while all of the tread stock lies forward of the median line between the two cord layers.

In testimony whereof I have hereunto set my hand.

FRED B. CARLISLE.